Dec. 23, 1969   J. L. WILSON   3,485,449
GRASS EDGING AND WATERING DEVICE
Filed Oct. 9, 1967   2 Sheets-Sheet 1

INVENTOR.
JESSE L. WILSON
BY
Bailey + Doity
ATTORNEYS

INVENTOR.
JESSE L. WILSON
BY
Bailey + Dority
ATTORNEYS

United States Patent Office

3,485,449
Patented Dec. 23, 1969

3,485,449
GRASS EDGING AND WATERING DEVICE
Jesse L. Wilson, P.O. Box 155,
Travelers Rest, S.C. 29690
Filed Oct. 9, 1967, Ser. No. 673,646
Int. Cl. A01g 25/06
U.S. Cl. 239—201                5 Claims

ABSTRACT OF THE DISCLOSURE

A grass edging and watering device adapted to be used adjacent borders of walks and plant beds for arresting the growth of grass adjacent the borders. The device has longitudinally spaced spray heads communicating with a bore extending therethrough for watering areas adjacent the border. The device has a longitudinally extending mower strip which arrests the growth of grass thereunder. Poison can be carried on the bottom of the mower strip for aiding in the killing of grass thereunder.

---

Figure 1:
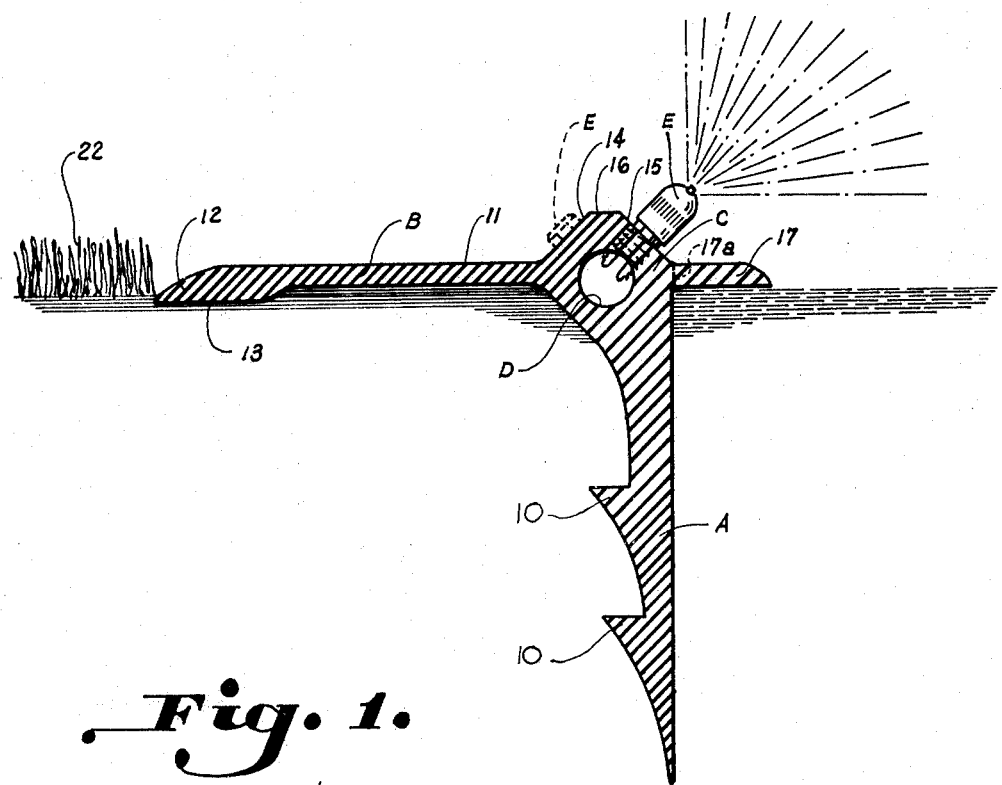

The invention relates to a grass edging and watering device adapted to be used adjacent borders of walks and plant beds, and more particularly to a device which has a mower strip for arresting the growth of grass thereunder, and a longitudinal bore for conveying water to spray heads for watering areas adjacent the device.

One of the most important things in maintaining neat lawns and flower beds is to prevent grass from growing over edges of walks and into the flower beds. When using hand operated cutting devices, edging the grass is both burdensome and time consuming. One method of preventing grass from creeping over desired borders includes placing a redwood mower strip adjacent the flower beds or metal strips embedded within the ground. These devices have not proven to be satisfactory since the grass will frequently creep up on the mower strip requiring the wheel of the lawn mower to be run on the mower strip when mowing the grass adjacent thereto. When the wheel of the lawn mower rides on the mower strip such raises the cutting blade thereabove, and it is still necessary to come along with an edger to produce a neat appearing border.

In addition to the problem of edging around the borders of flower beds and the like, such have to be watered, either requiring built-in watering systems or through the use of hoses.

Several patents have been granted on edging devices. However, for one reason or another they have not proven to be satisfactory and do not accomplish the same results as the edging and watering device constructed in accordance with the present invention. The Richter Patent No. 3,041,781 granted on July 3, 1962, discloses a lawn edging device which includes a hinged mower strip. One of the apparent disadvantages of such an edging device is that it can only be used on straight line walks and the like, since the hinge would not operate properly on curves. Another disadvantage in the lawn edging device is that it provides no means for watering the area adjacent the border. Moreover, it appears that it would be expensive to construct since several elements have to be manufactured separately and joined together. The same disadvantages would apparently be present in lawn edging devices constructed in accordance with the Hendrixson Patent No. 2,713,751 granted on July 26, 1955. A French Patent No. 1,422,293 granted to M. Victor Plouviez on Nov. 15, 1965, illustrates a device for watering selected areas. However, it would still be necessary to use an edger adjacent the hose-type sprinkler system, and such could be damaged when struck with a lawn mower during the mowing operation.

The lawn edging and watering device constructed in accordance with the present invention provides an effective edging flange, as well as a guide along which the lawn mower can run during the mowing operation. A longitudinal bore extends through the extruded device and sprinkler heads communicate with such for supplying water to desired areas.

Accordingly, it is an important object of this invention to provide an improved grass edging and watering device adapted to be used adjacent the borders of walks and plant beds.

Another important object of the present invention is to provide a grass edging and watering device which can be extruded in a single extrusion and is very simple to construct.

A further important object of the present invention is to provide a bed retainer or coping which inhibits the growth of grass into the bed and provides a means for watering selected areas of the bed.

Still another important object of the grass edging and watering device constructed in accordance with the present invention is to provide a guide for the wheel of a lawn mower during mowing operations so as to prevent damage to the watering system associated therewith.

A further important object of the present invention is to provide a mower strip and bed retainer which can be readily treated with poison to inhibit the growth of grass and the like.

Still another important object of the present invention is to provide a grass edging and watering device which facilitates the watering of areas adjacent walks and the like, without wasting water and wetting the walks.

The construction designed to carry out the invention will be hereinafter described, together with other features thereof.

Figure 2:
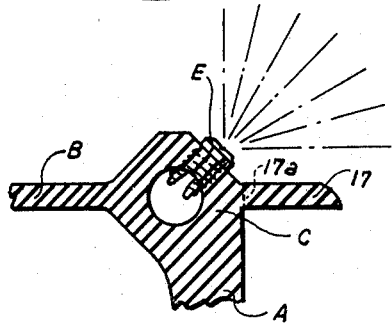

The invention will be more readily understood from a reading of the following specification and by reference to the accompanying drawings forming a part thereof, wherein an example of the invention is shown and wherein:

FIGURE 1 is a sectional view of a grass edging and watering device constructed in accordance with the present invention, FIGURE 2 is a fragmentary sectional view illustrating another style nozzle which may be utilized with the device constructed in accordance with the present invention.

Figure 3:
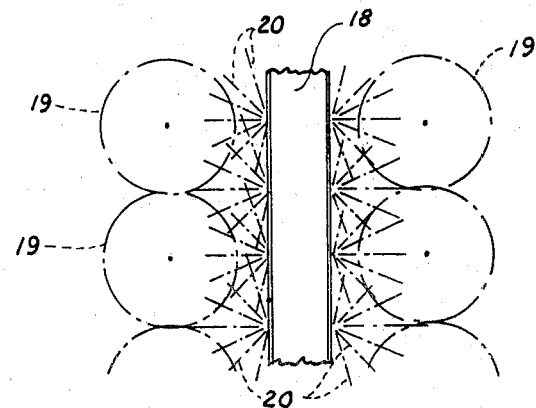
Figure 4:
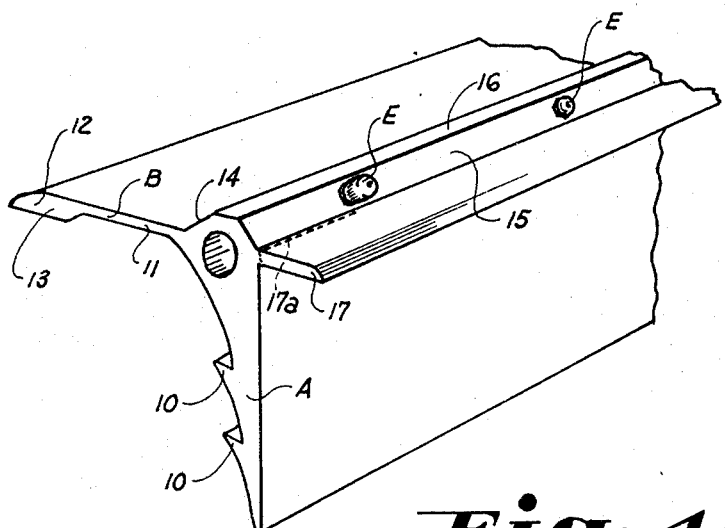
Figure 5:
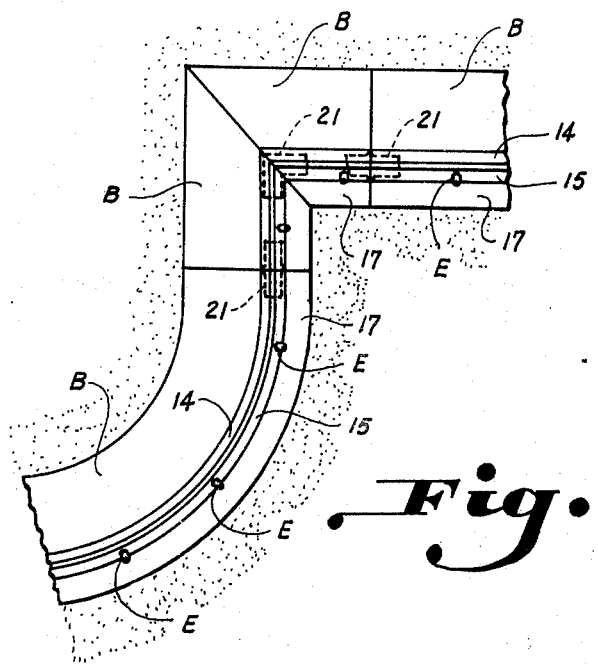

FIGURE 3 is a plan view illustrating the grass edging and watering device constructed in accordance with the present invention positioned along the side of a walk showing the cooperation of the watering pattern produced thereby, with conventional watering patterns, FIGURE 4 is a perspective view of a portion of a grass edging and water sprinkling device constructed in accordance with the present invention, and FIGURE 5 is a plan view illustrating the manner in which co-operating sections of the device constructed in accordance with the present invention are coupled together.

Referring more particularly to the drawings, a grass edging and watering device is illustrated which is adapted to be used adjacent borders of walks, plant beds, and the like. The device includes an extruded section having a longitudinal extending vertical anchoring leg A carried in the earth adjacent the border. A substantially flat longitudinally extending mower strip B is integral with the top portion of the vertical leg and extends outwardly therefrom for arresting the growth of grass thereunder. An enlarged longitudinally extending body portion C projects above the juncture of the anchoring leg A and the flat mower strip B. A longitudinal bore D extends through the enlarged body portion C for carrying water therethrough. Longitudinally spaced spray heads E are carried on the body portion C and communicate with the bore D for conveying water from the bore for watering the surrounding area. Thus, the device arrests the growth of grass adjacent the border and conveys water for watering the area adjacent thereto. For example, if the device is being used for a border around a shrubbery bed, the mower strip B would inhibit the growth of the grass coming from the adjacent lawn into the bed while the spray heads E could be strategically positioned for watering the shrubbery in the bed.

The device may be extruded in a single extrusion using any suitable plastic material, such as polyethylene. The vertical anchoring leg A has outwardly extending barbs 10 positioned thereon for anchoring the leg in the ground after such has been positioned therein. If the earth in which the vertical anchoring leg A is to be positioned is relatively soft, such can be pressed therein until the mower strip B becomes flush therewith. In hard clays and the like, it may be necessary to dig a small trench for accommodating the anchoring leg A and after positioning the leg therein pack the earth therearound for securing such.

The top of the anchoring leg A flares outwardly to define an enlarged body portion C. The substantially flat longitudinally extending mower strip B is integral with the top of the vertical leg and the enlarged body portion C. The flat mower strip has a relatively thin portion 11 adjacent the juncture to provide flexibility thereto. The outer end 12 of the mower strip is enlarged slightly greater than the flat portion 11 to add weight thereto for minimizing buckling and to hold the mower strip flush on the earth. The bottom surface 13 in one embodiment has an adhesive strip glued thereto, which is treated with a conventional poison to inhibit the growth of grass thereunder. In another embodiment the poison is embedded in the plastic material adjacent the bottom surface 13 for killing grass and the like, close thereby. The purpose of making the mower strip thin adjacent the body portion C is to add flexibility to the strip so that such can be raised during installation in order that grass adjacent the end thereof can be pulled outwardly. The mower strip is then allowed to fall back to the earth and kill any grass thereunder by depriving such of light.

The enlarged longitudinally extending body portion C adjacent the juncture of the mower strip and the anchoring leg A has a pair of opposed angled side walls 14 and 15, respectively, which are joined by a substantially flat top 16. A bore D extends longitudinally through the body portion C for carrying water through the length of the body portion. Any suitable pressurized source of water may be coupled to the end of the bore either through a conventional hose coupling secured in the end of the bore, or through an underground pipe secured to the bore by any suitable means, such as gluing.

When the grass edging and watering device is used adjacent the border of a flower bed the mower strip B extends outwardly towards the grass and adjustable nozzles E are positioned in the side wall 15 for spraying water onto the flowers or shrubbery located within the bed. The adjustable nozzles or spray heads E are conventional self-tapping items, and may be positioned in the side wall by first punching a hole through the side wall with an ice pick or the like, and then screwing the nozzle therein. When the device is being used in locations where the spray heads E could be damaged by stepping on, or other moving devices, it may be desired to use a spray head which fits closely adjacent the side wall 15 as illustrated in FIGURE 2. Both of the nozzles illustrated in FIGURES 1 and 2 are conventional nozzles and may be purchased from any suitable manufacturer.

In some applications it is desirable to have a flange projecting from the body portion C on the opposite side thereof from the mower strip as designated by reference numeral 17. This flange 17 is scored along the dotted line 17a so that such can be broken off when not desired. In some applications such flange 17 would prevent growth of weeds and grass between the edge of the device and walks where such is to be located. The flange 17 would, also, minimize the possibility of foreign matter, such as earth and cut grass, from interferring with the spray heads E.

FIGURE 3 illustrates the grass edging and watering device being utilized adjacent a walk 18. When such a use is contemplated the spray heads E would be located within the side wall 14 adjacent the mower strip B for spraying over the mower strip onto the adjoining grass. When other conventional sprayers are used for watering the grass covered area, generally they would distribute the water in a circular pattern, and if such were used to water the grass area adjacent the walk, it would also wet the walk. Such is undesirable and by locating the spray heads E in the side wall 14 water can be sprayed onto the grass area adjacent the walk without wetting the walk and thus providing a neater and more efficient watering system for lawns.

The circular water pattern 19 produced by conventional watering devices co-operate with the water pattern 20 produced by the device constructed in accordance with the present invention to produce a uniform watering of the lawn which does not overlap onto the walks and the like.

FIGURE 5 illustrates the manner in which various shaped sections of the grass edging and watering device can be joined for edging at right-angles and around curves. A conventional hose nipple 21 having a corrugated outer surface is inserted within the bore D of adjoining pieces of the edging device. Any suitable plastic glue can be utilized to secure such therein. Glue is also used to join the edges of adjacent pieces of material of the device so that cracks do not develop and allow grass to grow therethrough. In laying the edging device around curved borders sections can be cut from the mower strip B so that buckling does not develop when the device is bent around the curves and the cut edges can be glued together with any suitable plastic glue. The curved portion can, also, be formed during the molding process or bent under heat to conform to the particular desired border.

When the grass 22 adjacent the mower strip requires mowing the wheel of the lawn mower is run on top of the mower strip B and abuts against the side wall 14 which acts as a guide during the mowing operation so as to prevent the mower from damaging the spray heads E. If the spray heads are desired in the side wall 14, such should be close fitting heads, as illustrated in FIGURE 2, so that the lawn mower wheels will not strike them during the mowing operation. It is noted that the anchoring leg A prevents root systems of grass and the like from extending under the mower strip B into the restricted area.

What is claimed is:

1. A grass edging and watering device adapted to be used adjacent borders of walks and plant beds comprising an extruded section having, a longitudinally extending vertical anchoring leg carried in the earth adjacent said border, a substantially flat longitudinally extending mower strip integral with the top of said vertical leg and extending outwardly therefrom for arresting the growth of grass thereunder, an enlarged longitudinally extending body portion projecting above the juncture of said anchoring leg and said flat mower strip, a longitudinal bore extending through said enlarged body portion adapted to carry water, and longitudinally spaced spray heads carried on said body portion communicating with said bore for conveying water from said bore to water the surrounding area, whereby said device arrests the growth of grass adjacent said border and conveys water for watering the area adjacent said border.

2. The device as set forth in claim 1, wherein said enlarged body portion has a pair of opposed angled side walls carried thereon, one of said side walls accommodating said spray heads and the other wall acting as a guide for the wheel of a lawn mower as the mower is pushed along said mower strip when cutting grass adjacent thereto.

3. The device as set forth in claim 1, wherein barbs are carried on said anchoring leg for holding said device in the earth.

4. The device as set forth in claim 1, wherein the underside of said flat longitudinal strip has poison carried thereon for preventing the growth of grass.

5. The device as set forth in claim 1, wherein a flange extends outwardly from said body portion opposite said mower strip directly under said spray heads for preventing foreign matter from interfering with the operation of said spray heads.

References Cited

UNITED STATES PATENTS

| | | | |
|---|---|---|---|
| 606,151 | 6/1898 | Johnson | 47—33 |
| 2,080,341 | 5/1937 | Schumacher | 239—201 |
| 2,449,731 | 9/1948 | Therrien | 285—115 |
| 3,387,786 | 6/1968 | Rynberk | 239—201 |

FOREIGN PATENTS

| | | |
|---|---|---|
| 1,422,293 | 11/1965 | France. |

EVERETT W. KIRBY, Primary Examiner

U.S. Cl. X.R.

47—33; 239—200, 288.3